(12) United States Patent
Kaplan et al.

(10) Patent No.: US 9,178,903 B1
(45) Date of Patent: Nov. 3, 2015

(54) SIMULATING A BOT-NET SPANNING A PLURALITY OF GEOGRAPHIC REGIONS

(71) Applicant: SYNACK, INC., Menlo Park, CA (US)

(72) Inventors: Jay Kaplan, Palo Alto, CA (US); Mark Kuhr, Los Altos, CA (US); Vlad Cretu, San Francisco, CA (US)

(73) Assignee: Synack, Inc., Menlo Park, CA (US)

( * ) Notice: Subject to any disclaimer, the term of this patent is extended or adjusted under 35 U.S.C. 154(b) by 0 days.

(21) Appl. No.: 14/558,096

(22) Filed: Dec. 2, 2014

(51) Int. Cl.
*G06F 21/00* (2013.01)
*H04L 29/06* (2006.01)

(52) U.S. Cl.
CPC ....... *H04L 63/1433* (2013.01); *H04L 2463/144* (2013.01)

(58) Field of Classification Search
None
See application file for complete search history.

(56) References Cited

U.S. PATENT DOCUMENTS

| | | | |
|---|---|---|---|
| 5,502,816 A * | 3/1996 | Gawlick et al. | 709/227 |
| 2003/0009696 A1 * | 1/2003 | Bunker V. et al. | 713/201 |
| 2007/0117536 A1 * | 5/2007 | Walker et al. | 455/404.2 |
| 2012/0078643 A1 * | 3/2012 | Nagpal et al. | 705/1.1 |
| 2013/0174256 A1 * | 7/2013 | Powers | 726/23 |
| 2013/0174259 A1 * | 7/2013 | Pearcy et al. | 726/25 |
| 2013/0232565 A1 * | 9/2013 | O'Connor et al. | 726/13 |
| 2014/0189081 A1 * | 7/2014 | Morris | 709/223 |

* cited by examiner

*Primary Examiner* — Abu Sholeman
*Assistant Examiner* — Maung Lwin
(74) *Attorney, Agent, or Firm* — Hickman Palermo Becker Bingham LLP

(57) ABSTRACT

Computer systems and methods in various embodiments are configured to test the security of a server computer by simulating a wide range of attacks from one or more bot-nets. In an embodiment, a computer system including a memory; a processor in a home geographic region coupled to the memory; a plurality of network cards in the home geographic region, coupled to the processor and the memory; wherein each network card in the plurality of network cards is configured to send one or more requests to a remote server computer through a geographic region, of a plurality of geographic regions, that is different than the home geographic region; wherein, for each network card of the plurality of network cards, the processor is configured to store a geo-mapping, which indicates the certain geographic region the network card is configured to send the one or more requests to the remote server computer through.

18 Claims, 7 Drawing Sheets

SIMULATING A BOT-NET SPANNING A PLURALITY OF GEOGRAPHIC REGIONS

FIELD OF THE DISCLOSURE

The present disclosure generally relates to security techniques applicable to computer security, and relates more specifically to improved techniques for detecting vulnerabilities of a web server computer by simulating a bot-net.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Server computers may provide users with content through one or more client devices. The content may include social data, such as who knows whom, or personal financial information from a bank.

A malicious user may use software, often referred to as a "bot", which imitates a client computer, or an application executed by the client computer, by receiving instructions from a web server and generating requests based on those instructions. For convenience of expression a "bot" may be software and/or hardware, such as a browser running on a desktop computer, that is configured to automatically send requests with, and/or for, data to a server computer. For example, a bot may receive a web page, and generate a request based on a link defined in the web page, as if the link was selected by a legitimate user. Also for example, a bot may generate and send a request with data assigned to one or more parameters to simulate a user submitting data to a web server through a browser.

A proactive server computer may determine that a particular client computer is a bot based on one or more patterns and/or factors, such as receiving numerous requests from a particular client computer within a short period of time. In response, the server computer may block the client computer. For example, if a web site hosting an online dictionary receives 10,000 requests for definitions of 10,000 different words in an hour from the same client computer, then the server computer may determine that the client computer is a bot, and block any future requests from that client computer.

To prevent a server computer from determining that a particular client computer is a bot, a malicious user may create a "bot-net": a network of numerous computers distributed over a range of geographic regions, which may coordinate an attack against a server computer without causing the server computer to determine that any computer in the bot-net is a bot. Malicious users may use bot-nets to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, and stack fingerprinting attacks. For purposes of illustrating a clear example, assume a bot-net includes 400 infected computers, each of which is configured to make 25 requests for definitions of 25 different words over an hour. The proactive server computer may not register any of the client computers in the bot-net as a bot, because each computer is only requesting definitions for 25 words per hour. If each computer in the bot-net makes a request for a different word, then the bot-net may collect definitions for 10,000 words combined. Each computer in the bot-net may send the definitions to a server computer controlled by the malicious user.

A web site developer or administrator may attempt to implement countermeasures to prevent attacks from bot-nets, but testing those countermeasures can be difficult or expensive. For example, a web site developer may create a bot-net by setting up hundreds of servers in data centers around the world, and writing complex software to simulate a bot-net. Doing so is expensive and time-consuming. Furthermore, malicious users create new attacks for bot-nets to perform. Writing new, often more complex software to simulate new bot-net attacks using computers in data centers around the world may be difficult and expensive.

SUMMARY

The appended claims may serve as a summary of the invention.

Figure 1:
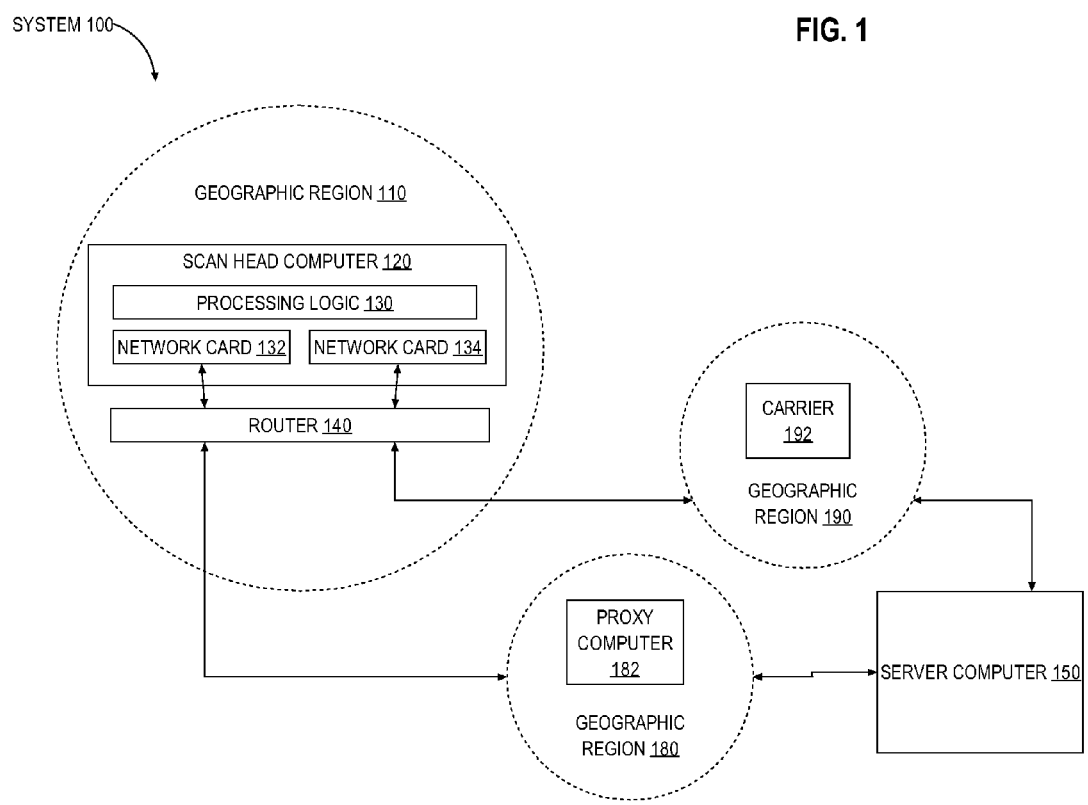
FIG. 1 illustrates a computer system for simulating a multi-region bot-net from a single geographic region in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer System for Simulating a Bot-Net from a Single Geographic Region
   2.1 Scan Head Computer
   2.2 Router
   2.3 Region-Request Distribution Value 3.0 Process for Simulating a Bot-Net
   3.1 Generating Data for Requests Sent through a Plurality Of Geographic Regions
   3.2 Sending and Receiving Data through a Plurality of Regions
   3.3 Detecting Services and Performing Attacks over One or More Protocols using a Simulated Bot-Net
4.0 Example Computer System for Simulating a Plurality of Attacks from one or more Bot-Nets using a Library of Test Modules
   4.1 Test Module Manager Computer
   4.2 Scan Head Computers
   4.3 Embedded Device
   4.4 Testing Proxy Server Computer
   4.5 Storage and Memory
   4.6 Consultant Computers
   4.7 Test Modules
5.0 Process Overview
   5.1 Receiving a Plurality of Test Modules
   5.2 Selecting Test Modules to Execute
      5.2.1 Scheduling Execution of Test Modules
      5.2.2 Determining Module Dependencies
         5.2.2.1 Executing Test Modules based on Dependencies
      5.2.3 Selecting System and/or Hardware Configurations
   5.3 Distributing Test Modules to be Executed on one or more Computers
   5.4 Executing a Test Module
      5.4.1 Simulating a Bot-Net Based on a Test Module
      5.4.2 Automatically Executing a Test Module Referenced by a Recently Executed Test Module
   5.5 Verifying the Test Modules Executed Correctly
   5.6 Executing more than one Test Module
6.0 Re-executing Modules after Determining a Failure has Occurred Using a Matrix or State Table
7.0 Implementation Mechanisms—Hardware Overview
8.0 Other Aspects of Disclosure

1.0 General Overview

In an embodiment, a computer system comprises a memory in a home geographic region; a processor in the home geographic region coupled to the memory; a plurality of network cards in the home geographic region, coupled to the processor and the memory; wherein each network card in the plurality of network cards is configured to send one or more requests to a remote server computer through a certain geographic region, of a plurality of geographic regions, that is different than the home geographic region; wherein, for each network card of the plurality of network cards, the processor is configured to store in the memory a geo-mapping, of a plurality of geo-mappings, wherein the geo-mapping indicates the certain geographic region the network card is configured to send the one or more requests to the remote server computer through.

In an embodiment, the computer system comprises a processing logic coupled to the memory, the processor, and the plurality of network cards, wherein the processing logic is configured to, generate a plurality of requests, and for each request of the plurality of requests: determine that the request should be received by the remote server computer through a particular geographic region based on a region-request distribution value; determine that a particular network card of the plurality of network cards is configured to send requests through the particular region; send the request to the remote server computer through the particular network card.

In an embodiment, the computer system comprises a processing logic coupled to the memory, the processor, and the plurality of network cards, wherein the processing logic is configured to: receive a credential from a device, which an application executed on the device used to authenticate with the remote server computer; send a plurality of requests, which include the credential, through two or more network cards, of the plurality of network cards, wherein each network card of the two or more network cards is associated with a different geographic region.

In an embodiment, the computer system comprises a processing logic coupled to the memory, the processor, and the plurality of network cards, wherein the processing logic is configured to execute a plurality of testing modules; a management logic coupled to the memory, the processor, and the processing logic, wherein the management logic is configured to, for each testing module of the plurality of testing modules, determine whether one or more conditions associated with the testing module are satisfied, and if so, cause the processing logic to execute the testing module.

In an embodiment, a computer system comprises a first scan head comprising a first memory, a first processor, and a first plurality of network cards in a home geographic region, wherein each network card in the first plurality of network cards is configured to send one or more network security testing requests to a remote server computer through a certain geographic region, of a first plurality of geographic regions, that is different than the home geographic region; a second scan head comprising a second memory, a second processor, and a second plurality of network cards in the home geographic region, wherein each network card in the second plurality of network cards is configured to send one or more network security testing requests to the remote server computer through another particular geographic region, of a second plurality of geographic regions, that is different than the home geographic region; wherein the first plurality of geographic regions is different than the second plurality of geographic regions.

In an embodiment, a method comprises: configuring a plurality of network cards in a home geographic region to send requests through a plurality of geographic regions that are different than the home geographic region; for each network card of the plurality of network cards, generating a geo-mapping, of a plurality of geo-mappings, that indicates a certain geographic region that the network card is configured to send the one or more requests through; generating a plurality of requests, and for each request of the plurality of requests: determining that the request should be received by a remote server computer through a particular geographic region based on a region-request distribution value; determining, based on the plurality of geo-mappings, that a particular network card of the plurality of network cards is configured to send requests through the particular region; sending the request to the remote server computer through the particular network card.

Embodiments discussed herein provide numerous benefits and improvements over the general idea of increasing the resistance of server computer to bot-net attacks. For example, one or more of the embodiments discussed herein may reduce the complexity and cost in simulating bot-net attacks from client computers from a plurality of geographic regions. One or more of the embodiments discussed herein may employ an interdependent module-based system to selectively determine whether or not a server computer may be vulnerable to one or more particular attacks, thus reducing the time to determine which one or more vulnerabilities a server computer may have, if any. One or more of the embodiments discussed herein may allow a server computer to use less computational resources because a plurality of client computers need not be hosted in data centers in many of different geographic regions. Furthermore, a single computer in a single geographic region may be used to appear to be multiple client computers distributed across multiple geographic regions.

2.0 Example Computer System for Simulating a Bot-Net from a Single Geographic Region FIG. 1 illustrates a computer system for simulating a multi-region bot-net from a single geographic region in an example embodiment. A "multi-region" bot-net may be a bot-net wherein, from the point of view of a server computer, requests appear to be coming from client computers in different geographic regions. In FIG. 1, system 100 includes scan head computer 120 and router 140 in geographic region 110, proxy computer 182 in geographic region 180, carrier 192 in geographic region 190, and server computer 150 communicatively coupled over one or more computer networks. A carrier may be a service provider that may assign one or more Internet Protocol ("IP") associated with a particular geographic region to a computer or computing device, such as scan head computer 120, network card 134, and/or router 140. Server computer 150 may be a computer that executes one or more services that receive, and/or send data to, one or more other computers. The services may include, among other things, web services, file transfer services, and/or data storage service.

A computer may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

2.1 Scan Head Computer

Scan head computer 120 may be a computer with a plurality of network cards. In the example illustrated in FIG. 1, scan head computer 120 includes network card 132 and network card 134. Each network card is configured to send and receive data from server computer 150 through a different geographic region.

Scan head computer 120 comprises processing logic 130, which may be hardware, and/or software executed on scan head computer 120, configured to send requests to, and receive data from, server computer 150 through a plurality of different geographic regions. For example, processing logic 130 may maintain "geo-mappings" that indicate network card 132 is configured to send and receive data through geographic region 180, and network card 134 is configured to send and receive data through geographic region 190. The geo-mappings may be assigned dynamically and/or stored in-memory and/or in non-volatile storage. A geo-mapping may indicate which IP address is assigned to, and/or associated with, a network card from a server computer's point of view. Two geo-mappings that map two network cards to the same geographic region may be non-sequential. For example, a first network card may be associated with a first IP address in a first geographic region: 38.104.134.186; a second network card may be associated with a second, non-sequential IP address in the same, first geographic region: 38.104.134.122.

For purposes of illustrating a clear example, scan head computer 120 has two network cards; however, scan head computer 120 may include many more network cards. Each network card in scan head computer 120 is mapped to a different geographic region; however, scan head computer 120 may include more than one network card that is associated with the same geographic region.

In FIG. 1, each network card is configured to send and receive data from server computer 150 through geographic regions that are different than the "home" geographic region that scan head computer 120 and router 140 are located in; however, one or more network cards may be configured to send and receive data from the home geographic region, which in this example is geographic region 110. A "home" geographic region may be a region that a scan head with a plurality of networks cards, and/or a router configured to map the network cards to a plurality of geographic regions, is located in and/or connected through.

2.2 Router

Router 140 may route data to and/or from a plurality of network cards to and/or from a plurality of different geographic regions. For purposes of illustrating a clear example, assume that network card 132 is connected to a first input port in router 140, and network card 134 is connected to a second input port in router 140. Router 140 may map the first input port to a first output port that is configured to send and/or receive data through proxy computer 182 in geographic region 180. Router 140 may map the second input port to a second output port that is configured to send and/or receive data through carrier 192 in geographic region 190. A geo-mapping that corresponds to a network card may indicate which input port the network card is coupled to, and/or which output port is mapped to the input port.

If router 140 receives data, such as a request for server computer 150, from network card 132 through the first input port, then router 140 may route the data to server computer 150 through the first output port and proxy computer 182, which may have an IP address associated with geographic region 180. If router 140 receives data through the first output port from proxy computer 182, then router 140 may route the data to network card 132 through the first input port. Accordingly, from the point of view of server computer 150, data sent to, and/or received from, network card 132 appears to be from geographic region 180 based on the IP address of proxy computer 182.

If router 140 receives data, such as a request for server computer 150, from network card 134 through the second input port, then router 140 may route the data to server computer 150 through the second output port and carrier 192, which may assign an IP address to the second output port of router 140 that is associated with geographic region 190. Accordingly, from the point of view of server computer 150, data sent to, and/or received from, network card 134 appears to be from geographic region 190 based on the IP address assigned to router 140 by carrier 192.

IP addresses associated with the same geographic region and assigned to more than one router port and/or network card may be non-sequential. Requests coming from sequential IP addresses may appear to be working in concert with each other. Accordingly, if sequential IP addresses are associated with two router ports and/or network cards, then processing logic 130, an administrator, and/or other logic, may request a new IP address for at least one router port and/or network card. For example, a geo-mapping may indicate which IP address is associated with a router port and/or network card. If processing logic 130 determines that two router ports and/or or network cards are assigned sequential IP addresses based on the corresponding geo-mappings, then processing logic 130 may request a different IP address for at least one router port and/or network card and update the corresponding geo-mapping(s) with the new IP address(es). Thus, to a server computer, the two router ports and/or network cards may appear to be separate client computers that are not working in concert with each other.

In FIG. 1, router 140 is coupled to, and routes data to and/or from, network cards in the same computer. However, router 140 may be connected to, and route data to and/or from, one or more network cards from a plurality of different computers.

In FIG. 1, each output port in router 140 is configured to send and/or receive data from server computer 150 through geographic regions that are different than the home geographic region that scan head computer 120 and router 140 are located in; however, one or more output ports may be configured to send and/or receive data from the home geographic region, which in this example is geographic region 110.

Router 140 may be hardware, such as a router or hub, and/or software, communicatively coupled to each network card. In FIG. 1, router 140 is a separate computer than scan head computer 120; however, router 140 and scan head computer 120 may be the same computer.

2.3 Region-Request Distribution Value

A region-request distribution value may be a value, data structure, and/or other system or method that defines how many requests should be sent, and/or the rate at which each request should be sent, through each region, IP address, and/or network card. For example, a region-request distribution value may indicate that 50 requests per hour should be made by each region. If more than one network card is configured to send requests through the same region, then each network card may send requests until 50 total requests are sent by the plurality of network cards. Additionally or alternatively, a region-request distribution value may indicate particular regions and/or IP addresses that one or more requests should be sent through.

Additionally or alternatively, the region-request distribution value may define how many requests should be sent through each IP address, and/or network card, in each region, and/or the rate at which each request should be sent through each IP. For purposes of illustrating a clear example, assume a region-request distribution value indicates no more than 50 requests should be sent per region, and that no more than 25 requests per hour sent per IP address and/or network card. If one network card is mapped to a first region, then the network card may send up to 25 requests through the first region per hour. If two network cards are mapped to a second region and each network card is assigned a different IP address, then both network cards may send up to 25 requests per hour, for a total of 50 requests, through the second region. If three network cards are mapped to a third region and each are assigned a different IP address, then each network card may send up to 25 requests per hour until a total of 50 requests are sent through the third region. Accordingly, of the three network cards mapped to the third region, the first card may send 10 requests, the second card may send 25 requests, and the third card may send 15 requests.

Additionally or alternatively, a region-request distribution value may indicate the amount of time that should elapse between requests for each region, network card, and/or IP address. For example, a region-request distribution value may indicate that a network card should wait a particular number of seconds after sending a first request before sending a second request. The region-request distribution value may indicate that each network card mapped to the same particular region should wait a particular amount of time after sending a first request before sending a second request.

The region-request distribution value need not assign the same number of requests to the same region, IP address, and/or network card. For example, the region-request distribution value may indicate that one or more network cards assigned to a first region should send requests to a server computer according to a first frequency, and one or more network cards assigned to a second region should send requests to the same server computer according to a second frequency that is different than the first frequency.

A region-request distribution value may indicate that one region should send more requests than another. For example, if a web server computer serves web pages in English, and then receives 500 requests from an IP address assigned to a carrier in China over a period of an hour, then the web server computer may raise a red flag. In response, the web server computer may block future requests from that IP address.

A region-request distribution value may also define a variable frequency over region, time, and/or IP address. For purposes of illustrating a clear example, assume that geographic region 180 is associated with a "U.S. East Region", and geographic region 190 is associated with a "U.S. West Region". The region-request distribution value may indicate that processing logic 130 should send more requests through geographic region 180 than geographic region 190 from 8:00 PM to 9:59 PM Eastern Time, and fewer requests through geographic region 180 than geographic region 190 from 10:00 PM to 11:59 PM Eastern.

A region-request distribution value may be modified and/or defined by a simulation (referred to herein as a test module) and/or an administrator. For example, an administrator may set a default region-request distribution value. Additionally or alternatively, a particular region-request distribution value may be associated with a particular simulation, which processing logic 130 may use to override a default region-request distribution value.

3.0 Process for Simulating a Bot-Net

Figure 2:
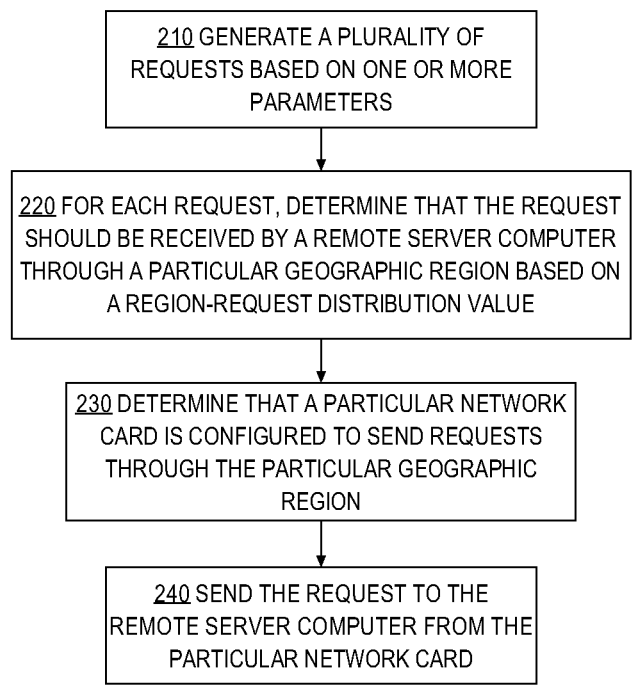
FIG. 2 illustrates a process for simulating a bot-net in an example embodiment.
Figure 4:
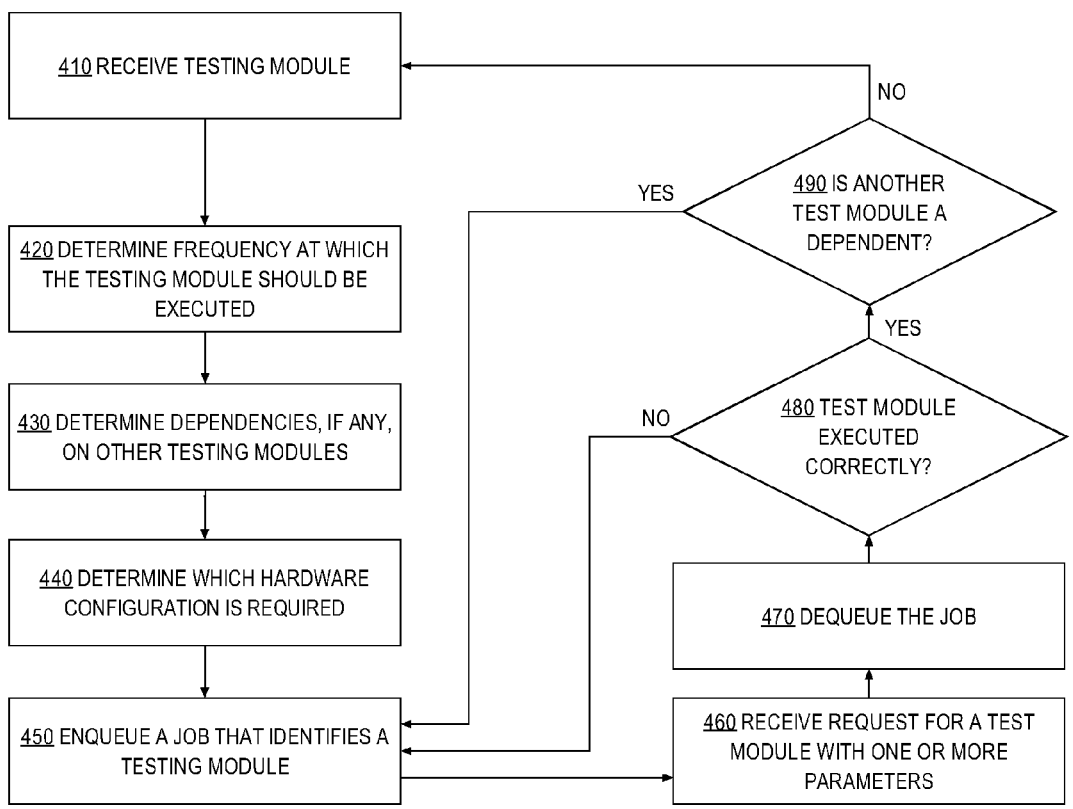
FIG. 4 illustrates a process for executing one or more test modules in an example embodiment.
Figure 6:
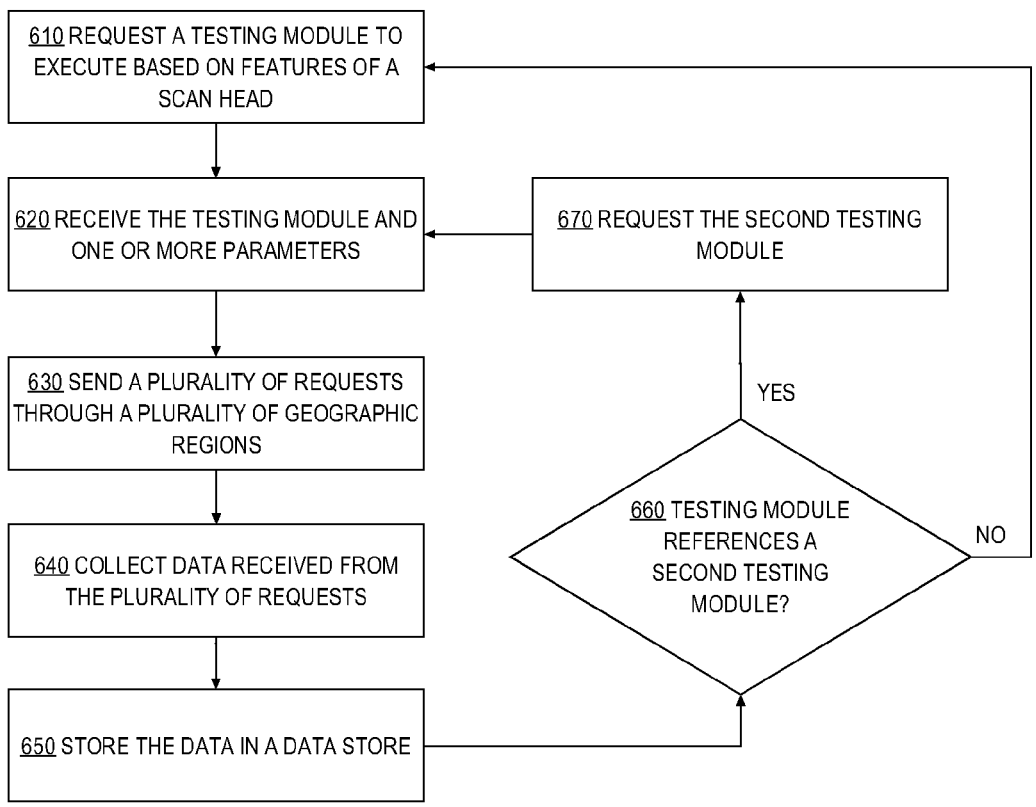
FIG. 6 illustrates a process for requesting and executing one or more test modules on a scan head in an example embodiment.

FIG. 2 illustrates a process for simulating a bot-net in an example embodiment. For purposes of illustrating a clear example, assume the following: processing logic 130 is configured to simulate a bot-net gathering data from a web site by requesting web pages from server computer 150, and each web page served by server computer 150 in response to a request with a particular word contains one or more definitions of the particular word. FIG. 2, as well as FIG. 4 and FIG. 6, may serve as plans or instructions with which a person of skill may prepare or code one or more computer programs, other software elements such as methods or scripts, or other logic that is configured to perform the steps that are shown in the blocks of the drawing figures using any of a variety of programming languages or environments including but not limited to JAVA, C++, OBJECTIVE-C, C, and design languages that are used to define gate structures of FPGAs or ASICs. In other words, FIG. 2, FIG. 4, FIG. 6 illustrate algorithms that can be used as a basis for coding or programming functional logic or programs that implement the processes that are depicted in the drawing figures.

3.1 Generating Data for Requests Sent Through a Plurality of Geographic Regions

In step 210, a computer generates a plurality of requests based on one or more parameters. For example, processing logic 130 may generate 10,000 URLs, each of which may identify a different word.

In step 220, the computer, for each request, determines that the request should be received by a remote server computer through a particular geographic region based on a region-request distributions value. For purposes of illustrating a clear example, assume a region-request distribution value indicates that each available region should be assigned an equal number of requests. Accordingly, processing logic 130 may assign 5,000 URLs to each region: geographic region 180 and geographic region 190.

In step 230, the computer may determine that a particular network card is configured to send requests through the particular geographic region. For purposes of illustrating a clear example, assume processing logic 130 maintains two geo-mappings: the first geo-mapping indicates that network card 132 sends and/or receives data through geographic region 180, and the second geo-mapping indicates that network care 134 sends and/or receives data through geographic region 190. Accordingly, processing logic 130 may assign the first 5,000 URLs to network card 132 based on the first geo-mapping, and the second 5,000 URLs to network card 134 based on the second geo-mapping Network cards that are assigned to the same region may be assigned different URLs. For example, if one or more geo-mappings indicate that a plurality network cards are associated with the same geographic region, then each network card associated with the same geographic region may be assigned an equal share of the URLs assigned to that region.

3.2 Sending and Receiving Data Through a Plurality of Regions

In step 240, the computer sends a request to the remote server computer from the particular network card. For purposes of illustrating a clear example, assume processing logic 130 has a default region-request distribution value indicating that 60 requests may be sent each hour from each unique IP address. Processing logic 130 may cause network card 132 and network card 134 to send a request each minute through geographic region 180 and geographic region 190, respectively.

Processing logic 130 may cause network cards to wait between requests. Continuing from the previous example, if network card 132 gets a response to a particular request from server computer 150 within two seconds, then processing logic 130 may cause network card 132 to wait for some amount of time, such as 58 seconds. Otherwise, if network card 132 receives a response within two seconds of every request, then network card 132 may send all 60 requests within the first two minutes. A human reading definition(s) of 60 words over the course of an hour may be a plausible use case. Therefore, server computer 150 may allow 60 requests from the same network card and/or IP address over an hour. However, few, if any, humans could read definitions for 60 words in less than two minutes, and is therefore not a plausible use case. Therefore, server computer 150 may determine that the network card and/or IP address, which is sending a request every two seconds, is a bot and block future requests from the network card and/or the IP address.

In the example above, after the URLs are generated, each URL is assigned to a geographic region and/or network card. However, URLs, parameters, and/or any other data may be iteratively generated and/or assigned to one or more geographic regions and/or network cards before all the URLs, parameters, and/or other data elements are generated and/or determined.

3.3 Detecting Services and Performing Attacks Over One or More Protocols Using a Simulated Bot-Net The example above may be performed over a web-based protocol, such as HyperText Transfer Protocol ("HTTP"), Secure HyperText Transfer Protocol ("HTTPS"), and/or SPDY. However, a bot may perform a variety of attacks over a variety of protocols. For example, a bot may make several requests to several different ports to determine which ports a server is responsive to, and/or which services a server is executing. Particular ports that are actively waiting for, and/or responding to, requests may indicate which services are available on a server computer, and potentially, are susceptible to attack. For example, if a server responds to a request over port 22, then the server may support a cryptographic network protocol commonly referred to a Secure Shell ("SSH"), which may be susceptible to a first set of attacks. If a server responds a request over port 21, then the server may support File Transfer Protocol ("FTP"), which may be susceptible to a second, different set of attacks. After a bot determines that a particular port is open, or that a particular service is available on a server computer, the bot may execute a set of targeted attacks against the particular service to gain unauthorized access to, execute malicious commands on, and/or submit false data to, the server computer.

Processing logic 130 may cause network cards, such as network card 132 and network card 134, to simulate a bot-net performing a variety of attacks over a variety of protocols. For example, processing logic 130, and/or a test module, may cause network card 132 to send various requests to one or more specific ports on a server computer to determine which services, if any, are available on a first set of ports; processing logic 130, and/or a test module, may cause network card 134 to send various requests to one or more specific ports on a server computer to determine which services, if any, are available on a second, different set of ports. Accordingly, network card 132 may send a request to access server computer 150 via port 22 using SSH, and network card 134 may send a request to transfer a file to server computer 150 via port 21 using FTP. If server computer 150 responds to the request from network card 132 using SSH, even to reject the request for invalid credentials according to the SSH protocol, then processing logic 130 and/or a test module may use one or more of the methods and systems discussed herein to cause a plurality of network cards controlled by scan head computer 120 to simulate a bot-net carrying out a brute force attack on server computer 150 to discover a valid set of credentials.

A server administrator may cause a service on a server computer to wait for, and/or respond to, requests over a non-standard port. For example, a server administrator may configure an SSH service to wait for, and/or respond to, requests over port 3000. In response to network card 132 receiving a response to a request on port 3000, processing logic 130 and/or a test module may use one or more of the methods and systems discussed herein to determine which service is executing on port 3000. For example, processing logic 130 may cause network card 132 to send an HTTP request to port 3000, and cause network card 134 to send an SSH request to port 3000. The response by the server computer to the HTTP request may be different than the response to the SSH request. Processing logic 130 may determine from the response to the HTTP request that the server computer is not executing a particular web service on port 3000 because the response does not comply with the HyperText Transfer Protocol; however, processing logic 130 may determine from the response to the SSH request that the server computer is executing an SSH service on port 3000 because the response complies with the SSH protocol.

Figure 3:
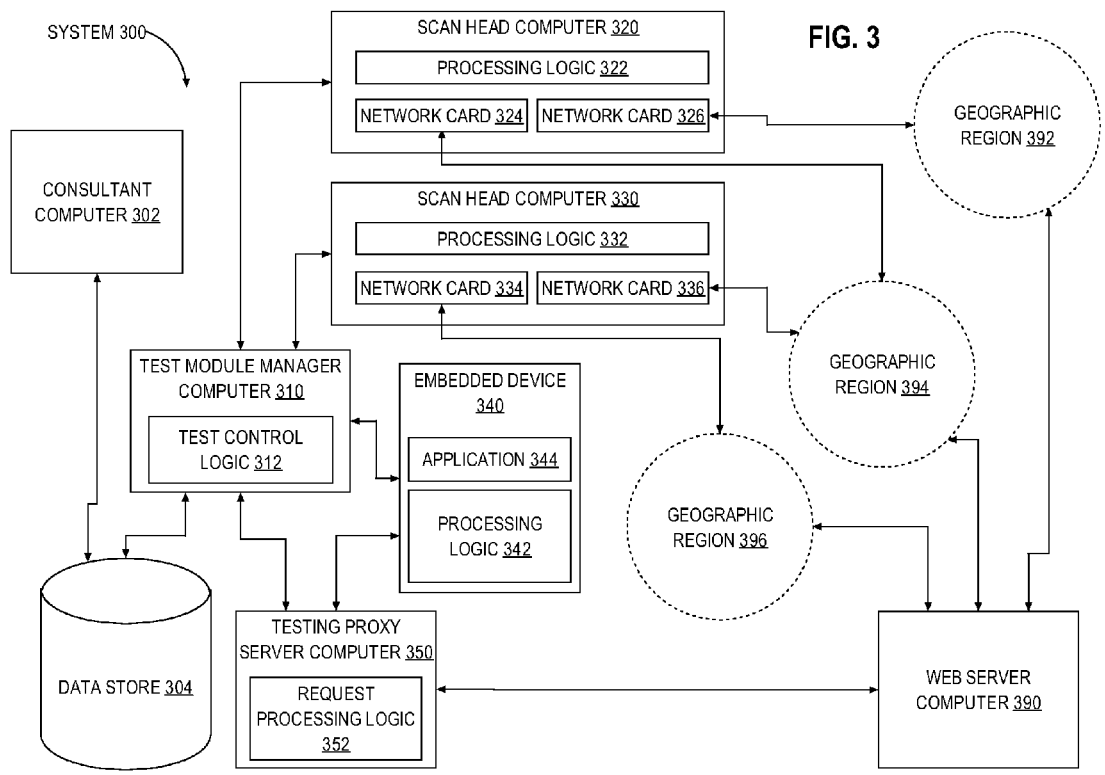
FIG. 3 illustrates a computer system for detecting a plurality of vulnerabilities and errors in a web-server by simulating a bot-net in an example embodiment.

4.0 Example Computer System for Simulating a Plurality of Attacks from One or More Bot-Nets Using a Library of Test Modules FIG. 3 illustrates a computer system for detecting a plurality of vulnerabilities and errors in a web-server by simulating a bot-net in an example embodiment. In FIG. 3, system 300 includes test module manager computer 310, scan head computer 320, scan head computer 330, embedded device 340, testing proxy server computer 350, consultant computer 302, test module and data store 304, web server computer 390, geographic region 392, geographic region 394, and geographic region 396 communicatively coupled over one or more computer networks. While each of the components listed above is illustrated as if running on a separate, remote computer from each other, one or more of the components listed above may be part of and/or executed on the same computer. For example, test module manager computer 310, scan head computer 320, scan head computer 330, testing proxy server computer 350, consultant computer 302, and test module and data store 304, and/or each of their components, may be part of, included in, and/or executed on the same computer, local area, and/or wide area network. For purposes of illustrating a clear example, web server computer 390 is referred to as a web server computer executing a web service, such as HTTP and/or HTTPS. However, additionally or alternatively, web server computer 390, like server computer 150, may execute one or more other services, such as SSH and/or FTP.

Figure 7:
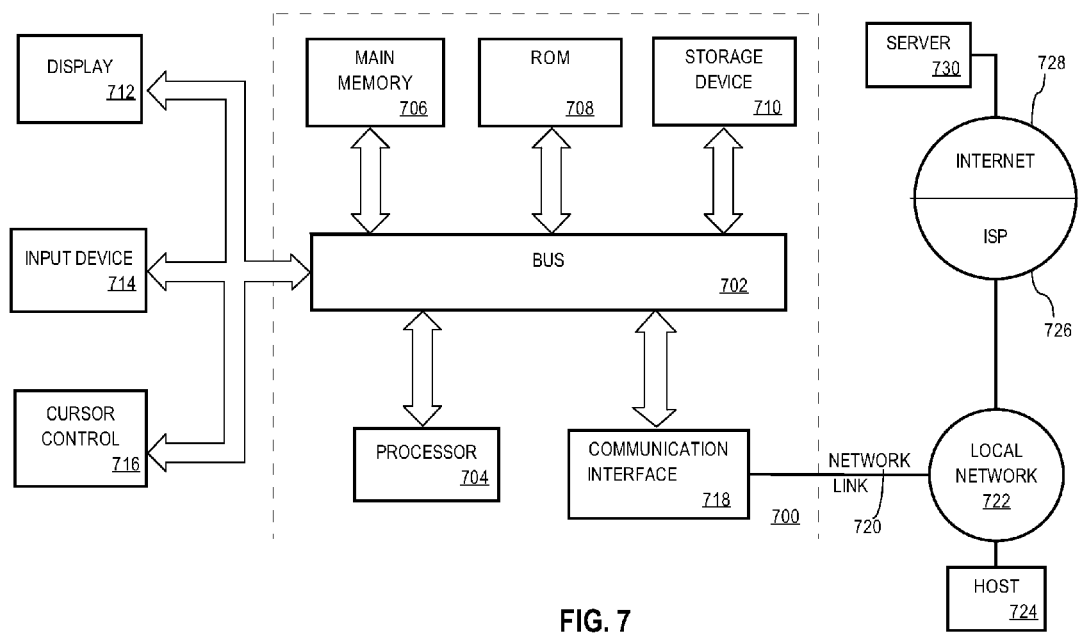
FIG. 7 illustrates a computer system upon which an embodiment may be implemented.

In an embodiment, each of the functional units of system 300 may be implemented using any of the techniques further described herein in connection with FIG. 7; for example, the test module manager computer 310, scan head computer 320, scan head computer 330, testing proxy server computer 350, data store 304, consultant computer 302, and/or web server computer 390 may each comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other. For example, test module manager computer 310, scan head computer 320, scan head computer 330, embedded device 340, testing proxy server computer 350 data store 304, and/or consultant computer 302 may be in the different geographic regions. However, each of the components above may be included in the same geographic region. For example, test module manager computer 310, data store 304, scan head computer 320, scan head computer 330, embedded device 340 and testing proxy server computer 350 may be in the same building, data center, and/or location. Additionally or alternatively, one or more of the components or functional units discussed herein may be behind, or routed through, the same router, carrier, and/or other gateway to the Internet and/or one or more other external computer networks.

One or more computers, modules, and/or logic may "execute" an application, library, process, module, and/or other logic on a computing device. "Executing" an application, process, module and/or logic may include launching, loading, spawning, interpreting, and/or executing the application, process, and/or a computer, module, and/or logic.

4.1 Test Module Manager Computer

Test module manager computer 310 may comprise test control logic 312, which may maintain and control one or more test modules configured to detect and/or exploit vulnerabilities of a server computer. Test control logic 312 may determine which test modules are executed, and in which order. Test control logic 312 may evaluate results produced from executing a first test module, and determine whether one or more other test modules should be executed. Additionally or alternatively, test control logic 312 may pass the results to one or more other test modules.

A test module may be software, such as an executable computer program, and/or data, such as structured data, that is executable by a computer, such as test module manager computer 310, scan head computer 320, embedded device 340, testing proxy server computer 350, and/or other computer. Additionally or alternatively, a test module may be software and/or data that may cause a processing logic to perform one or more tests against a target system. For example, a first test module may cause application 344 to send data through request processing logic 352 to web server computer 390. A second test module may cause request processing logic 352 to store intercepted data in data store 304. A third test module may cause processing logic 322 to send a plurality of requests to a server computer, through a plurality of regions, based on the data intercepted by request processing logic 352.

Test control logic 312 may coordinate one or more tests on different computers. For example, test control logic 312 may cause a first test module to be executed on embedded device 340 through processing logic 342, which causes application 344 to make a request to web server computer 390 through testing proxy server computer 350. Test control logic 312 may cause a second test module to be executed concurrently through request-processing logic 352, which may detect which port the request was sent over, one or more parameters that were used, one or more data elements that were sent, and/or any other attributes of the request. Test control logic 312 may store one or more test modules, data, applications, input data for one or more test modules, output data generated based on an application and/or test module, and/or data describing one or more vulnerabilities and errors detected in or more applications and/or web server computers.

Test control logic 312 may cause a test module to be executed in response to results from another test module. For purposes of illustrating another clear example, assume that a second test module indicates that a application 344 sent data to web server computer 390 over port 443, indicating that the data was encrypted using HTTPS. In response, test control logic 312 may cause scan head computer 320 and/or scan head computer 330 to execute one or more test modules that test for one or more HTTP and/or Secure Socket Layer ("SSL") vulnerabilities, such as a particular vulnerability that allows an attacker to read data stored in the memory of unprotected server computer.

Test control logic 312 may be a state machine that causes one or more test modules to be executed based on the results generated by one or more other test modules and/or other parameters. For example, test control logic 312 may be configured to cause a particular module, "X", to be executed if, and/or in response to determining that, (1) X has not been executed within the last fifteen minutes, (2) both modules "Y" and "Z" have been executed since the last time X was executed, and (3) Y produced a particular result; test control logic 312 need not cause X to be executed otherwise.

4.2 Scan Head Computers

Scan head computer 320 and scan head computer 330 are similar to scan head computer 120 discussed in detail herein. In FIG. 3, scan head computer 320 and scan head computer 330 may each include a router and/or other logic configured to send and/or receive data from each network card to a particular geographic region. For example, network card 324 and network card 336 may be configured to send and/or receive data through geographic region 394. Network card 326 may be configured to send and/or receive data through geographic region 392. Network card 334 may be configured to send and/or receive data through geographic region 396.

Scan head computer 320 and scan head computer 330 include processing logic 322 and processing logic 332, respectively. Processing logic 322 and processing logic 332 may execute one or more test modules, and/or results generated from one or more test modules, stored in data store 304. Processing logic 322 and processing logic 332 may send results generated from one or more test modules to test module manager computer 310 and/or data store 304. Additionally or alternatively, processing logic 322 and/or processing logic 332 may pass results generated from a recently executed test module to a test module subsequently executed on the same scan head computer, and/or by the same processing logic. Additionally or alternatively, processing logic 322 and/or processing logic 332 may send data to each other through one or more network, shared memory, control test module manager computer 310 and/or any other mechanism and/or structure.

4.3 Embedded Device

Embedded device 340 may be an embedded device. Embedded device 340 may comprise one or more processors and/or memory. For example, embedded device 340 may be a smart phone. Embedded computing devices, such as smart phones and tablet computers, may be used to perform one or more specialized and/or dedicated functions. An embedded device may include components not normally provided on typical desktop computers, such as cellular radio modems, motion sensors, cameras, lights, global positioning system receivers, and other inputs. Embedded devices often include specialized hardware configurations. For example, a smart phone may include a processor that is optimized to minimize power consumption, which may allow the phone to operate longer before needing to be recharged. Embedded devices that have a built-in display may include specialized hardware configured to provide a higher refresh rate for the particular built-in display. In FIG. 1, test module manager computer 310 is coupled to a single embedded device; however, test module manager computer 310 may be coupled to, and/or cause one or more applications and/or test modules to be executed on, more than one embedded device.

Embedded device 340 may comprise application 344, which may be a specialized version of a particular application, which embedded device 340 may execute. Applications that run on embedded devices may be specialized based on the target embedded device(s). For example, source code and content for a particular application or project may be compiled and packaged to produce a first specialized application configured to be executed on a first embedded device with a first set of hardware. The same source code and content may be compiled and packaged again to produce a second, different specialized application configured to be executed on a second embedded device with a second, different set of hardware.

Embedded device 340 comprises processing logic 342. Processing logic 342 may be specialized hardware and/or software for embedded device 340 and/or application 344. Processing logic 342 may be executed by embedded device 340 and/or an application running on embedded device 340, such as an operating system or application 344. For example, processing logic 342 may be a pre-compiled, shared, and/or dynamically linked library specialized for the hardware and/or software configuration of embedded device 340. Application 344 may, at run-time, load processing logic 342 and cause one or more methods in processing logic 342 to be executed. Additionally or alternatively, processing logic 342 may, at run-time, load a test module and cause one or more methods in application 344 and/or processing logic 342 to be executed.

Processing logic 342 may receive one or more test modules and/or data associated with the one or more test modules, such as parameters, metadata, and/or results from one or more other test modules. Processing logic 342 may execute the one or more test modules. Processing logic 342 may send results generated from one or more test modules to test module manager computer 310, test control logic 312, and/or data store 304. Additionally or alternatively, processing logic 342 may pass results generated from a recently executed test module to a test module subsequently executed on embedded device 340, and/or by processing logic 342.

Processing logic 342, and/or a test module executed by processing logic 342, may be executed as if part of application 344. Processing logic 342, and/or a test module executed by processing logic 342, may be executed in parallel with application 344. Processing logic 342, and/or a test module executed by processing logic 342, may have access to the memory, hardware, modules, and/or other resources on embedded device 340 and/or in application 344, as if part of application 344. Processing logic 342, and/or a test module executed by processing logic 342, may be communicatively coupled with test module manager computer 310 and/or test control logic 312. Processing logic 342, and/or a test module executed by processing logic 342, may be created by a first entity, such as a testing facility, and application 344 may be created by a second, different entity, such as an application developer.

4.4 Testing Proxy Server Computer

Testing proxy server computer 350 may be a computer that is communicatively coupled with one or more embedded devices, control computers, external networks, and/or web server computers. For example, testing proxy server computer 350 may be communicatively coupled to embedded device 340, test module manager computer 310, web server computer 390, and the Internet.

Testing proxy server computer 350 may comprise request-processing logic 352, which intercepts and/or processes data sent from and/or to one or more embedded devices. Request-processing logic 352 may test and/or detect one or more vulnerabilities in one or more applications on one or more embedded devices in concert with test control logic 312, processing logic 342, processing logic 322 or processing logic 332. Request-processing logic 352 may report vulnerabilities to test control logic 312. Request-processing logic 352 may store attributes and/or vulnerabilities related to one or more applications on one or more embedded devices and/or a web server computer, such as web server computer 390, to data store 304.

Request-processing logic 352 may receive one or more test modules, metadata, parameters, and/or any other data related to a test module from test control logic 312. Request-processing logic 352 may execute one or more test modules on testing proxy server computer 350. A test module executed on testing proxy server computer 350 may perform one or more of the operations and/or functions discussed herein. Request-processing logic 352 may send results generated from one or more test modules to test module manager computer 310, test control logic 312, and/or data store 304. Additionally or alternatively, request-processing logic 352 may pass results generated from a recently executed test module to a test module subsequently executed on embedded device 340, and/or by request-processing logic 352.

One or more test modules executed by request processing logic 352 may, among other things, extract API calls to a server computer from a client application, determine whether data from and/or to a client application is secure, and/or test the security of a server computer. For example, request-processing logic 352 may intercept one or more requests and/or transmissions to a server computer, such as web server computer 390, from one or more other computers, such as embedded device 340 and/or a general purpose computer. Request processing logic 352 may store data in, and/or about, the requests and/or transmissions in data store 304 to re-create the requests and/or transmissions. The data may include URLs, parameter names, values, and/or any other content. One or more testing modules executed by processing logic 322, processing logic 332, and/or request processing logic 352 may re-generate requests and/or transmissions to the same server computer that the original requests and/or transmissions were made to, and/or a different server computer. The requests and/or transmission may include the same data as the original requests and/or transmissions. Additionally or alternatively, the requests and/or transmissions may include data that was not in the original requests and/or transmissions.

4.5 Storage and Memory

A data store and/or storage may be one or more databases, configuration files, file systems, computers, and/or data structures that store data in volatile and/or non-volatile memory. Storage, data stores, and/or memory may mean any non-volatile and/or volatile memory components capable of storing data, including electronic digital data storage devices. Data store 304 may be a data store that stores one or more test modules, applications, and/or data related to, and/or associated with, the one or more test modules and/or applications. For example, data store 304 may store a first test module to be executed in concert with a particular application stored in data store 304. Data store 304 may store one or more input parameters and/or data set used as input for the test module and/or application. Data store 304 may store results generated the test module and/or application.

4.6 Consultant Computers

Consultant computer 165 broadly represents any computer that may be used to retrieve and/or store a test module, application, and/or data associated with a test module and/or application from data store 304. The particular role of the user of the computer is not critical and the label "consultant" is used here merely for convenience to illustrate a clear example. A user, such as a computer security consultant, may use consultant computer 165 to create, store, and/or retrieve one or more test modules, encrypted applications, decrypted applications, and/or data related to, and/or associated with, the or more test modules and/or applications. The user may view results from one or more test modules stored on data store 304 on a display coupled to consultant computer 302.

4.7 Test Modules

A test module may be a configured to test for robustness or security of one or more server computers and/or applications. For example, request-processing logic 352 may execute a test module configured to determine whether application 334 is sending one or more requests to web server computer 390 over SSL. If so, the test module may reference another test module that is configured to cause test control logic 312, through one or more scan head computers, to test whether web server computer 390 is vulnerable to an attack that exploits one or more vulnerabilities in a particular SSL implementation.

A test module may be configured to test for robustness or security of a particular application and/or web server computer. For example, after a consultant determines the URL and the names of one or more parameters for logging into web server computer 390 as a valid user, the consultant may create a test module configured to determine a login and password of a different valid user using a brute force attack, the particular URL, and the one or more parameter names, through one or more scan heads.

A consultant may define one or more parameters, dependencies, and/or conditions under which a test module should be executed, for each test module uploaded. For example, a consultant, through consultant computer 302 may store metadata in data store 304 indicating that a first test module should be executed first, and if a particular result is generated by the first test module, then a second test module should be executed and the results from the first test module should be passed to the second test module.

Each test module may be written in one or more computer programming languages, scripting languages, and/or any other standard and/or proprietary instruction sets or structured data formats. For example, a first test module may be a pre-compiled, dynamically linkable library that may be executed by, and/or loaded into, a specialized application and/or logic on a particular hardware configuration, such as embedded device 340. A second test module may be an executable script, which may be executed by a virtual machine running on one or more computers with different hardware configurations, such as scan head computer 320, scan head computer 330, and/or testing proxy server computer 350.

5.0 Process Overview

One or more consultants may upload one or more test modules to be executed by one or more processing logic units on one or more computers. Test control logic may coordinate executing test modules across one or more processing logic units. Test control logic may store results in a data store, use the results as input while executing one or more other test modules, and/or determine whether one or more other test modules should be executed based on the results. Embodiments provide testing for errors and/or vulnerabilities in one or more web server computer and/or embedded devices.

5.1 Receiving a Plurality of Test Modules

FIG. 4 illustrates a process for executing one or more test modules in an example embodiment. In step 410, a control computer receives a test module. For example, a consultant may store the following test modules in data store 304: test module 510, test module 520, test module 522, test module 524, test module 530, and test module 532.

5.2 Selecting Test Modules to Execute

A consultant and/or other user may store metadata in data store 304 indicating one or more conditions and/or states under which a test module should be executed. The states may be based on the state of system 300, one or more components of system 300, one or more target systems, and/or one or more components of a target system. For purposes of illustrating a clear example, assume the following: a first state indicates whether a server computer, such as web server computer 390, accepts data sent by a client computer to a first URL and returns the same data to a client computer in response to a request to a second URL; and, a second state indicates whether the data was received as part of an HTML document. In response to determining the first state is positive, test control logic 312 may execute a first test module that attempts to perform a SQL injection attack against the server computer using the first URL to inject one or more SQL statements and the second URL to determine whether the SQL statements were executed. In response to determining the first state and the second state are positive, test control logic 312 may execute a test module that attempts to perform a JavaScript injection attack. However, test control logic 312 need not execute the second test module if the second state is not positive because even if JavaScript could be injected into the data, the target server and/or client devices may not be configured to execute the JavaScript rendering the attack moot. States may indicate, among other things, a frequency at which a test module should be executed, whether one or more other test modules were executed successfully, data generated from executing one or more other modules, one or more hardware configurations and/or dependencies, and/or network features. A state may be a parameter for a test module. For instance, in the current example, the first state included two URLs that which were used by the first testing module.

5.2.1 Scheduling Test Modules to Execute

In step 420, the control computer determines a frequency at which the test module should be executed. For example, the consultant may store metadata in data store 304 indicating that test module 510 should be executed each time a new version of application 344 is released. A consultant may store metadata in data store 304 indicating under what conditions a test module should be executed. For example, test module 520 should be executed each week until test module 510 fails to return a particular result after a new version is released. Accordingly, test control logic 312 may retrieve the metadata and determine how often, and/or under what conditions, test module 510 should be executed. The metadata for a particular test module may define a region-request frequency for each test module.

5.2.2 Determining Module Dependencies

Figure 5:
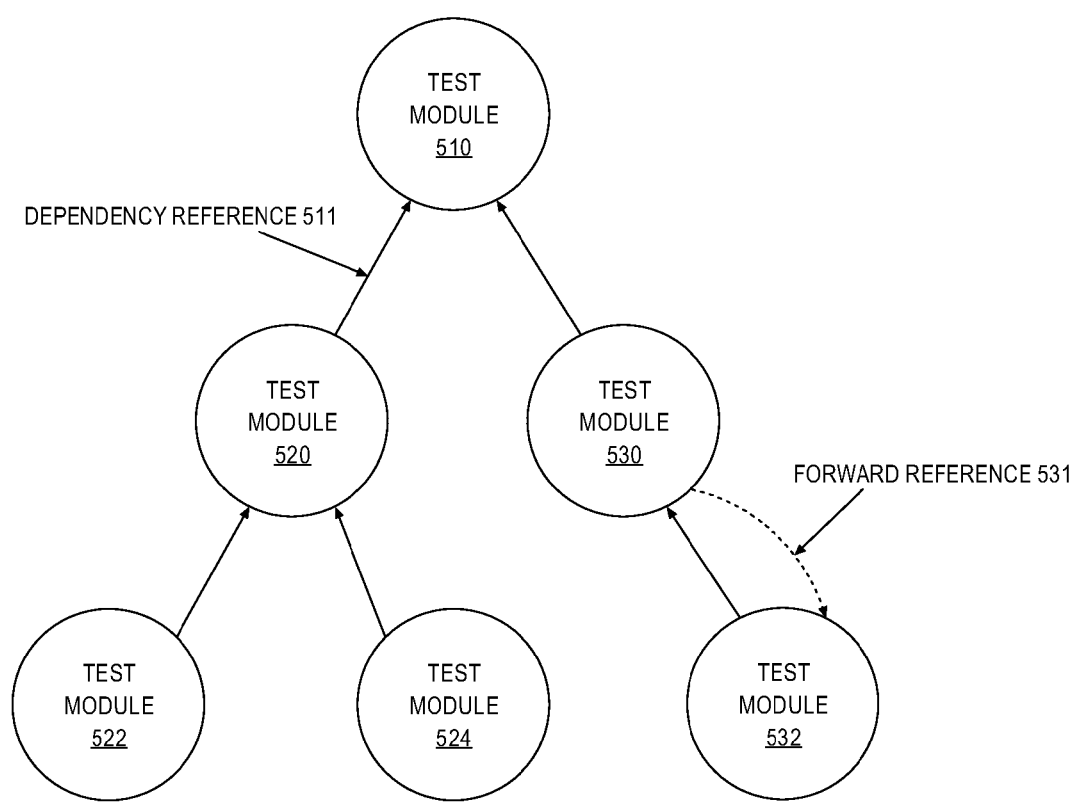
FIG. 5 illustrates a hierarchy of dependencies between test modules in an example embodiment.

In step 430, the control computer determines dependencies, if any, on other test modules. For purposes of illustrating clear example, assume the consultant stored metadata in data store 304 indicating that test module 520 and test module 530 depend on test module 510, test module 522 and test module 524 depend on test module 520, and test module 532 depends on test module 530. Test control logic 312 may generate an in-memory hierarchy similar to the data structure in FIG. 5. FIG. 5 illustrates a hierarchy of dependencies between test modules in an example embodiment. In FIG. 5, test module 520 depends on test module 510 as indicated by dependency reference 511. Each test module in FIG. 5 expressly depends on a single other test module; however, a test module may expressly depend on one or more other test modules. For example, in an embodiment, test module 524 may depend on both test module 520 and test module 530, which may each depend on test module 510.

A first test module may depend on a second test module if the first test module should be executed concurrently with the second test module, and/or process one or more results based, at least in part, by the second test module. For example, test module 510 may be executable by processing logic 342, and may be configured to cause application 344 to generate one or more requests to web server computer 390. Test module 520 may be a test module that is executable by request-processing logic 352, and configured to determine whether the requests made by application 344 are made over the HTTPS protocol. Test module 520 may also determine whether application 344 will accept SSL certificates signed by an untrusted source, by responding to requests from application 344 with a self-signed SSL certificate. Thus, test module 520 depends on test module 510 to determine whether requests made by application 344 are being sent over HTTPS.

5.2.2.1 Executing Test Modules Based on Dependencies

A first test module that depends on a second test module need not be executed if the second test module fails, and/or generate a particular outcome or result. For purposes of illustrating a clear example, assume test module 510 is configured to cause application 344 to perform one or more operations, test module 520 is configured to determine whether a network request from application 344 to web server computer 390 was made over SSL, and test module 530 is configured to determine whether the data returned was generated by web server computer 390 using a PHP engine. If test module 510 does not cause application 344 to generate a request to web server computer 390, then test module 520 and test module 530 need not be executed. Further assume that test module 532 is configured to perform test one or more vulnerabilities in particular implementations of a PHP engine. In the current example, test module 530 need not be executed, and since test module 532 depends on test module 530, then test module 532 need not be executed.

5.2.3 Selecting System and/or Hardware Configurations

In step 440, the control computer may determine which hardware configuration is required for each module. For example, a consultant may store data in, and test control logic 312 may retrieve data from, data store 304 indicating that test module 510 is configured to be executed on embedded device 340, test module 520 is configured to be executed on testing proxy server computer 350, and test module 522 is configured to be executed on a scan head computer that can send requests from geographic region 394 and/or geographic region 392. Additionally or alternatively, the metadata may indicating that test module 522 is configured to be executed on a scan head computer that is controls at least a particular number of network cards, connected through at least a particular number of distinct geographic regions, and/or is assigned at least a particular number of unique IP addresses through one or more carriers.

5.3 Distributing Test Modules to be Executed on One or More Computers

In step 450, the control computer queues a job that identifies a test module. For purposes of illustrating clear example, assume test control logic 312 maintains a queue of jobs, and each job may identify one or more test modules that are ready to be executed according to the metadata associated with each module. Furthermore, test module 530 is configured to cause a scan head computer to crawl a web site hosted on web server computer 390 to determine which page(s), if any, are generated using PHP (a server-side scripting language). Test control logic 312 may determine that test module 530 should be executed against a particular domain based on the results from one or more other test modules and/or metadata associated with test module 530. Accordingly, test control logic 312 may queue a job referencing test module 530, along with parameters, such as the particular domain name and a region-request frequency value.

In step 460, the control computer receives a request for a test module with one or more parameters. For example, processing logic 322 may send a request to test control logic 312 for a test module to execute. The request may indicate that processing logic 322 can simulate a bot-net, and can execute a test module based on range of region-request frequency values.

In step 470, the control computer dequeues the job. For purposes of illustrating a clear example, assume that test control logic 312 determines that scan head computer 320 and/or processing logic 322 is configured to execute test module 530 according to the parameters stored in the job queued in step 450. Test control logic 312 may dequeue the job queued in step 450 and send test module 530, along with the parameters stored in the dequeued job, to processing logic 322.

5.4 Executing a Test Module

FIG. 6 illustrates a process for requesting and executing one or more test modules on a scan head in an example embodiment. For purposes of illustrating a clear example, assume that test module 530 is a test module that is configured to be executed on a computer that simulates a bot-net. In step 610, the scan head computer requests a test module to execute based on features of a scan head. For example, processing logic 322 may send a request to test control logic 312 for a test module to execute. The request may indicate that processing logic 322 can simulate a bot-net, and is assigned a particular number of different IP addresses and/or is configured to send requests through specific geographic regions, such as geographic region 392 and geographic region 394.

In step 620, the scan head computer receives the test module and one or more parameters. For example, in response to the request in step 610, processing logic 322 may receive test module 530 from test control logic 312, along with one or more parameters. For purposes of illustrating a clear example, assume a first parameter is a region-request distribution value, a second parameter is a domain name that points to web server computer 390, and a third parameter is a cookie that identifies a particular authorized user account, which was created by a previously executed test module through application 344 on embedded device 340, stored on web server computer 390.

5.4.1 Simulating a Bot-Net Based on a Test Module

In step 630, the scan head computer sends a plurality of requests through a plurality of geographic regions. For purposes of illustrating a clear example, assume test module 530 is configured to cause scan head computer 320 to crawl a web site hosted on web server computer 390 to determine which page(s), if any, are generated using PHP (a server-side scripting language). Processing logic 322 may execute test module 530, causing processing logic to send a request to a web server computer 390 through network card 324 and geographic region 394 based on the domain name received in the previous step. Processing logic 322 may receive a first web page from web server computer 390, and traverse the web page to find links to one on more web pages in the same domain. Processing logic 322 may generate a request for each link found and send each request through a network card and geographic region according to the frequency-request distribution value received in step 620. Processing logic 322 may recursively and/or iteratively crawl the web site looking for a particular amount of time, until particular number of unique web pages have been received, and/or until one or more other parameters are satisfied.

In step 640, the scan head computer collects data received from the plurality of requests. For example, processing logic 322 may determine which pages were generated based on PHP script. Processing logic 322 may determine whether a web page was generated based on a PHP script using one or more techniques. For example, the if the URL that was used to request the web page included the characters ".php", then processing logic 322 may determine that the page was generated, at least partially, using a PHP script. Additionally or alternatively, processing logic 322 may determine that the page was generated, at least partially, using a PHP script if a header value includes the characters "PHP". For purposes of illustrating a clear example, assume test module 530 determines that at least one web page was generated, at least partially, using a PHP script.

In step 650, the scan head computer stores the data in a data store. For example, processing logic 322 may send data indicating which page(s), if any, in the web site hosted on web server computer 390 are generated based on PHP to test control logic 312. Test control logic 312 may store the data in data store 304.

5.4.2 Automatically Executing a Test Module Referenced by a Recently Executed Test Module In step 660, the scan head computer determines whether the test module references a second test module. If the test module does not include a reference to another test module, then control may proceed to step 610 and request a new test module from test control logic 312. Otherwise, control logic may proceed to step 670. For purposes of illustrating a clear example, assume test module 530 includes forward reference 531, which indicates that test module 532 should be executed after test module 530 is executed if at least one web page was deemed to have been generated at least in part by PHP, and test module 532 is configured to send one or more requests that exploit an vulnerability in a particular PHP implementation. In response to determining that at least one web page was generated at least in part by PHP in step 640, control proceeds to step 670.

In step 670, the scan head computer requests the second test module. For example, processing logic 322 may retrieve test module 532 from data store 304, and return to step 620. In step 620, processing logic 322 may retrieve parameters for test module 532 from data store 304 and/or test control logic 312. Additionally or alternatively, processing logic 322 may use the data generated by test module 530 in step 640. For example, processing logic 322 may pass the data generated from executing test module 530 to test module 532. Processing logic 322 may then execute test module 532. Processing logic 322 may use the same region-request frequency value as received for test module 530, a default region-request frequency value, and/or a region-request frequency value stored in metadata that is associated with test module 532 in data store 304.

5.5 Verifying the Test Modules Executed Correctly

Returning now to FIG. 4, in step 480, the control computer determines whether the test module was executed correctly. If not, control may proceed to step 450; otherwise, control may proceed to step 490. There are many ways to determine which test modules are being executed and determining whether any of the test modules failed to be executed correctly. For example, if test control logic 312 receives results from a processing logic 322 after executing test module 530, then test control logic 312 may determine that test module 530 was executed correctly, and may proceed to step 490. If, however, test control logic 312 receives an error, and/or fails to receive results, from processing logic 322, test control logic 312 may proceed to step 450. In step 450, test control logic 312 may re-queue the job that was dequeued in step 470; the job may reference test module 530 and include the same metadata. The consultant that created and/or stored the test module that was not executed correctly, an administrator, and/or other user, may be notified via an email, text message, alert, and/or other notification that indicates the test module did not execute correctly and whether one or more particular errors were generated.

In step 490, the control computer determines whether another test module is dependent on the recently executed test module. If so, then control may proceed to step 450; otherwise, control may proceed to step 410. For example, test control logic 312 may determine that test module 532 depends on test module 530. In response, test control logic 312 may queue a job that references test module 532 and includes a set of metadata comprising results returned from processing logic 322 after executing test module 530.

5.6 Executing More than One Test Module

In the examples discussed above, a processing logic may execute a test module, and upon finishing the test module may request and execute a new test module. However, a processing logic may request and/or execute more than one test module concurrently.

The number of test modules a processing logic may execute concurrently may be configurable based on the processing logic, the hardware and/or software stack of the computer the processing logic is being executed on, and/or one or more preferences stored in data store 304. For example, processing logic 342 may be a dynamic library that is loaded by application 344 at run-time, and configured to load a test module into memory on embedded device 340 to test application 344. Two test modules running concurrently in the same isolated sandbox and/or memory space as application 344 may cause chaotic results; thus, processing logic 342 may be configured to execute a single test module at a time per application. However, if multiple applications are running on embedded device 340, and each application dynamically loads processing logic 342 into each application's isolated sandbox and/or memory space, then each instance of processing logic 342 may load a test module into the application's isolated sandbox.

In contrast, in an embodiment, processing logic 322 may be a stand-alone application running on scan head computer 320. Each test module executed by processing logic 322 may be a standalone application that is executed by scan head computer 320, and configured to send and/or receive data through processing logic 322. Accordingly, processing logic 322 may be configured to request and/or execute more than one test module concurrently on scan head computer 320.

6.0 Re-Executing Modules after Determining a Failure has Occurred Using a Matrix or State Table Test control logic 312, an administrator, a consultant, and/or other logic or user may determine that a particular test module was executed incorrectly, and/or one or more parameters should be changed. In response, test control logic 312 may cause the particular test modules, and any dependent test modules, to be re-executed with a corrected set of one or more parameters. The one or more parameters may be one or more states that indicate whether a test module should be executed. Additionally or alternatively, the one or more parameters may be used as input by the test module. The one or more results may be one or more states that indicate whether a second test module should be executed. Additionally or alternatively, the one or more results may be used as input by the second test module. The first test module may, but need not be, different than the second test module.

There are many ways to determine which modules should be re-executed with which parameters. For example, test control logic 312 may maintain a matrix, which may also be referred to as a state table, to determine which modules were executed with which parameters and/or states. For purposes of illustrating a clear example, assume Matrix 1 is an excerpt of a matrix that indicates which modules were executed with which parameters.

| Matrix 1: | | |
|---|---|---|
| 510 | First set of one or more parameters | First set of one or more results |
| 520 | First set of one or more results | Second set of one or more results |
| 510 | Second set of one or more parameters | Third set of one or more results |
| 520 | Third set of one or more results | Fourth set of one or more results |

In Matrix 1, in the first column of each row, a test module that has been executed is identified, the second column indicates the set of parameters that were used, and the third column indicates the set of results that are generated. For example, the first row of Matrix 1 indicates that test module 510 was executed based on a first set of one or more parameters. The second row of Matrix 1 indicates that test module 520 was executed based on results generated from test module 510 and the first set of one or more parameters. The third row indicates that test module 510 was executed based on a second set of one or more parameters. The third row indicates that test module 520 was executed based on results generated from test module 510 and the second set of one or more parameters.

In response to determining that the first set of parameters was incorrect, invalid, and/or modified, test control logic 312 may cause each module that was executed based on the first set of parameters to be re-executed using one or more methods and systems discussed herein. In the current example, test control logic 312 may cause test module 510 to be re-executed and regenerate the first set of one or more results. If a previously generated set of results was used as input for one or more other test modules, then test control logic 312 may traverse the matrix and cause each of the one or more other test modules to be re-executed using the updated results using one or more of the methods and systems discussed herein. For example, test control logic 312 may determine, based on the matrix, that test module 520 was executed based on results that have been updated. In response, test control logic 312 may re-execute test module 520 using one or more the systems and methods discussed herein.

Test control logic 312 may determine whether one or more additional modules should be executed based one or more updated parameters and/or one or more updated results. For example, after re-executing test module 510 with a modified set of parameters, the first set of results may be different, and may indicate a different set of states under which one or more additional test modules should be executed. Accordingly, test control logic 312 may cause the one or more additional test modules to be executed based on the new, different first set of results. Additionally or alternatively, test control logic 312 may determine whether one or more entries in the matrix should be deleted. For example, after re-executing test module 510 with a modified first set of parameters, the first set of results may be different indicating that test module 520 need not be executed based on the first set of results. Accordingly, the row indicating that test module 520 was executed using the first set of results may be deleted from the matrix.

A second test module, however, need not be re-executed merely because it depends on a module that was re-executed. For example, after test module 510 is re-executed and updates the first set of results, test control logic 312 may cause test module 520 to be re-executed based on the updated first set of results. However, test control logic 312 need not re-execute test module 520 based on the third set of one or more results because there is no apparent relation between the third set of one or more results and the updated first set of one or more results.

If a test module is updated, then test control logic 312 may re-execute the updated test module and each dependent module for each set of results that are regenerated. For example, if test module 510 is updated by a consultant, then, based on the matrix, test control logic 312 may execute test module 510 twice: once using the first set of one or more parameters, and again using the second set of one or more parameters, which may change the first set of one or more results and the third set of one or more results. If the first set of one or more results is changed, then test control logic 312 may re-execute test module 520 based on the updated first set of one or more results. If the third set of one or more results is changed, then test control logic 312 may re-execute test module 520 based on the updated third set of one or more results.

Test control logic 312 may create a new entry in the matrix each time a test module is executed based on a new data set. Each entry may comprise the test module executed, the set of states and/or input parameters, if any, and the set of output states and/or results, if any. Test control logic 312 need not create a new entry in the matrix after re-executing a test module in response to determining that a test module and/or set of parameters were updated.

7.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
a memory in a home geographic region;
a processor in the home geographic region coupled to the memory;
a plurality of network cards in the home geographic region, coupled to the processor and the memory;
wherein each network card in the plurality of network cards is configured to send one or more requests to a remote server computer through a certain geographic region, of a plurality of geographic regions, that is different than the home geographic region;
wherein, for each network card of the plurality of network cards, the processor is configured to store in the memory a geo-mapping, of a plurality of geo-mappings, wherein the geo-mapping indicates the certain geographic region the network card is configured to send the one or more requests to the remote server computer through;
a processing logic coupled to the memory, the processor, and the plurality of network cards, wherein the processing logic is configured to:
receive one or more first parameters from a device;
produce one or more second parameters based on the one or more first parameters, wherein the one or more second parameters are different than the one or more first parameters;
produce one or more third parameters based on the one or more first parameters, wherein the one or more third parameters are different than the one or more first parameters and the one or more second parameters;
send a first request with the one or more second parameters to the remote server computer through a first geographic region of the plurality of geographic regions;
send a second request with the one or more third parameters to the remote server computer a second geographic region of the plurality of geographic regions.

2. The system of claim 1 comprising a processing logic coupled to the memory, the processor, and the plurality of network cards, wherein the processing logic is configured to generate a plurality of requests, and for each request of the plurality of requests:
determine that the request should be received by the remote server computer through a particular geographic region based on a region-request distribution value;
determine, based on the plurality of geo-mappings stored in the memory, that a particular network card of the plurality of network cards is configured to send requests through the particular geographic region;
send the request to the remote server computer through the particular network card.

3. The system of claim 2, wherein at least two requests, of the plurality of requests, are sent through two different network cards of the plurality of network cards, and each network card, of the two different network cards, is configured to send requests to the remote server computer through a different geographic region of the plurality of geographic regions.

4. The system of claim 1 comprising a processing logic coupled to the memory, the processor, and the plurality of network cards, wherein the processing logic is configured to:
receive a credential from the device, which an application executed on the device used to authenticate with the remote server computer;
send a plurality of requests, which include the credential, through two or more network cards, of the plurality of network cards, wherein each network card of the two or more network cards is associated with a different geographic region.

5. The system of claim 1, wherein the processing logic is configured to receive the one or more first parameters sent from the device to the remote server computer.

6. The system of claim 1 comprising:
a processing logic coupled to the memory, the processor, and the plurality of network cards, wherein the processing logic is configured to execute a plurality of testing modules;
a management logic coupled to the memory, the processor, and the processing logic, wherein the management logic is configured to, for each testing module of the plurality of testing modules, determine whether one or more conditions associated with the testing module are satisfied, and if so, cause the processing logic to execute the testing module.

7. The system of claim 6, wherein:
the one or more conditions associated with a first testing module of the plurality of testing modules are based on results derived from execution of a second testing module;
the management logic is further configured to:
cause the processing logic to execute the second testing module;
determine whether the one or more conditions are satisfied based on results derived from execution of the second testing module;
in response to determining that the one or more conditions are satisfied, causing the processing logic to execute the first testing module.

8. The system of claim 6, wherein the management logic is configured to determine from the one or more conditions associated with a particular testing module, of the plurality of testing modules, a frequency at which the particular testing module should be executed, and causing a the processing logic to execute the particular testing module according to the frequency.

9. The system of claim 1 comprising:
a processing logic coupled to the memory, the processor, and the plurality of network cards, wherein the processing logic is configured to execute a plurality of testing modules, wherein a first testing module, of the plurality of testing modules, depends on a second testing module, of the plurality of testing modules;
a management logic coupled to the memory, the processor, and the processing logic, wherein the management logic is configured to determine processing logic did not successfully execute the second testing module, and in response, cause the processing logic to execute the second testing module successfully before causing the processing logic to execute the first testing module.

10. A system comprising:
a first scan head comprising a first memory, a first processor, a first processing logic, and a first plurality of network cards in a home geographic region, wherein each network card in the first plurality of network cards is configured to send one or more network security testing requests to a remote server computer through a certain geographic region, of a first plurality of geographic regions, that is different than the home geographic region;
a second scan head comprising a second memory, a second processor, a second processing logic, and a second plurality of network cards in the home geographic region, wherein each network card in the second plurality of network cards is configured to send one or more network security testing requests to the remote server computer through another particular geographic region, of a second plurality of geographic regions, that is different than the home geographic region;
wherein the first plurality of geographic regions is different than the second plurality of geographic regions;
a management computer comprising a memory, a processor coupled to the memory, and a management logic coupled to the memory, the processor, the first processing logic, and the second processing logic, wherein the management logic is configured to update a queue of objects, wherein each object in the queue of objects identifies a testing module of a plurality of testing modules, and one or more particular geographic regions;
wherein the first processing logic is configured to:
request, from the management logic, a front-most object in the queue of objects that identifies a first testing module and one or more first particular geographic regions that are included in the first plurality of geographic regions;
execute the first testing module identified by the object, causing one or more request to be sent from the first plurality of network cards;
wherein the second processing logic is configured to:
request, from the management logic, a front-most object in the queue of objects that identifies a second testing module and one or more second particular geographic regions that are included in the second plurality of geographic regions;
execute the second testing module identified by the object, causing one or more requests to be sent from the second plurality of network cards.

11. A method comprising:
configuring a plurality of network cards in a home geographic region to send requests through a plurality of geographic regions that are different than the home geographic region;
for each network card of the plurality of network cards, generating a geo-mapping, of a plurality of geo-mappings, that indicates a certain geographic region that the network card is configured to send the one or more requests through;
generating a plurality of requests, and for each request of the plurality of requests:
determining that the request should be received by a remote server computer through a particular geographic region based on a region-request distribution value;
determining, based on the plurality of geo-mappings, that a particular network card of the plurality of network cards is configured to send requests through the particular geographic region;
sending the request to the remote server computer through the particular network card;
receiving one or more first parameters sent from a device;
producing one or more second parameters based on the one or more first parameters, wherein the one or more first parameters are different than the one or more second parameters;
producing one or more third parameters based on the one or more first parameters, wherein the one or more third parameters are different than both the one or more first parameters and the one or more second parameters;
including the one or more second parameters in a first request of the plurality of requests;
including the one or more third parameters in a second request of the plurality of requests;
wherein the method is performed on one or more computing devices.

12. The method of claim 11, wherein at least two requests, of the plurality of requests, are sent through two different network cards of the plurality of network cards, and each network card, of the two different network cards, is configured to send requests to the remote server computer through a different geographic region of the plurality of geographic regions.

13. The method of claim 11 comprising:
receiving a credential from a device, which an application executed on the device used to authenticate with the remote server computer;
including the credential in each request of the plurality of requests.

14. The method of claim 11, wherein the one or more first parameters were sent from the device to the remote server computer.

15. The method of claim 11 comprising:
for each testing module of a plurality of testing modules, determining whether one or more states associated with the testing module are satisfied, and if so, causing a processing logic to execute the testing module.

16. The method of claim 11 comprising:
causing a processing logic to execute a first testing module of a plurality of testing modules;
determining one or more states are set based on results derived from execution of the first testing module, and in response, causing the processing logic to execute a second testing module.

17. The method of claim 11 comprising determining from one or more states associated with a particular testing module, of a plurality of testing modules, a frequency at which the particular testing module should be executed, and causing a processing logic to execute the particular testing module according to the frequency.

18. The method of claim 11, comprising:
determining a first testing module, of a plurality of testing modules, depends on a second testing module, of the plurality of testing modules;
determining a processing logic did not successfully execute the second testing module, and in response, causing the processing logic to execute the second testing module successfully before causing the processing logic to execute the first testing module.

* * * * *